Patented Sept. 24, 1940

2,215,940

UNITED STATES PATENT OFFICE 2,215,940

ALIPHATIC-SULPHONATE SALTS OF THERAPEUTICALLY ACTIVE BASES

Horace A. Shonle, Indianapolis, Ind., assignor to Eli Lilly and Company, Indianapolis, Ind., a corporation of Indiana No Drawing. Application August 2, 1937, Serial No. 156,938

3 Claims. (Cl. 260—501)

It is the object of my invention to produce certain new aliphatic sulphonates of pressor substances of the class of β-phenyl-ethyl amine and its derivatives, to obtain products which are sufficiently stable, are water-soluble, and have greater lipoid solubility than have the known water-soluble salts of such organic bases.

Among those pressor substances are the following:

Ephedrine,
Epinephrine,
β-phenyl-ethyl amine,
Tyramine,
Benzyl-methyl-carbinamine,
Phenyl-1-amino-2-propanol-1,
Methyl-aminoaceto-catechol,
1-α-hydroxy-β-methylamino-3-hydroxyethylbenzene,
α-hydroxy-β-amino-3,4-dihydroxypropylbenzene.

I have discovered that these organic bases, in the class of β-phenyl-ethyl amine and its derivatives, will react with certain aliphatic sulphonic acids to produce therapeutically effective aliphatic sulphonates, which in many cases have certain advantages over the known salts of these bases, as for instance by reason of decreased toxicity, and/or lengthened action, and/or effectiveness in smaller dosages, and combined stability, water-solubility, and greater lipoid-solubility than known water-soluble salts.

The aliphatic sulphonic acids which I have found effective for this are those in which there is an aliphatic substituent having at least four but not to exceed eighteen carbon atoms. This aliphatic substituent may be either primary straight-chain or primary branched-chain or secondary, and either saturated or unsaturated. In general, by the term aliphatic sulphonic acid I mean one which is represented by the following formula:

(1) 

in which R represents such an aliphatic hydrocarbon group as has just been defined and contains a carbon atom that is directly joined to the sulphur atom of the sulphonic acid group. Among such aliphatic groups may be mentioned the following:

Butyl, amyl, hexyl, heptyl, octyl, nonyl, lauryl, myristyl, cetyl, stearyl, and oleyl.

The aliphatic sulphonic acids of my invention thus differ from the compounds which are sometimes called "mineral oil sulphonic acids"; for those so-called "mineral oil sulphonic acids" are complex mixtures of compounds having formulas which have never been satisfactorily demonstrated, and are probably mixtures of esters of sulphuric acid, rather than derivatives of true sulphonic acid, in that in their structure an oxygen atom almost certainly intervenes between the sulphur atom and the aliphatic group, and in any case they are at best a group of unknown things mixed together.

In making these new aliphatic sulphonates, I first prepare the desired aliphatic sulphonic acid. The various aliphatic sulphonic acids may be prepared by general methods described in the literature. For instance, see:

Annalen, vol. 148, p. 90, Strecker.
Annalen, vol. 148, p. 96, Bender.
Jour. Am. Chem. Soc., vol. 55, p. 1091, Noller and Gordon, and
Jour. Am. Chem. Soc., vol. 57, p. 570, Reed and Tartar.

After the desired aliphatic sulphonic acid is obtained, it may be caused to react, in solution in a suitable solvent with the desired organic base, to produce the desired aliphatic sulphonate. The organic bases used all contain a trivalent nitrogen atom. The reaction may be represented in general as follows:

(2) 

in which R has the same significance as before. $R^1$ represents the β-phenyl-ethyl group and its derivatives, and $R^2$ and $R^3$ represent hydrogen atoms or organic radicals which are united to the nitrogen atom.

The following are some examples of my process, and of the products obtained thereby.

Pressor substances

In the organic bases used in Examples 1, 2, 3, and 4 below, the organic base contains the following skeletal structure:

(3) 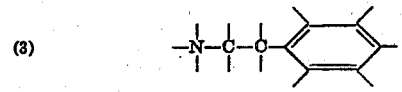

Example 1.—n-Butyl sulphonic acid, and ephedrine, are dissolved in separate portions of ethyl ether, and the two ethereal solutions are put together, in the cold. As an example, it is convenient to dissolve 10.4 gms. of n-butyl sulphonic acid in 100 cc. of the ether, and 10 gms. (slightly less than a molecular equivalent) of ephedrine in 200 cc. of the ether, and to gradually add one into the other, preferably with cooling and stirring. Reaction occurs, and the desired ephedrine n-butyl-sulphonate precipitates. This precipitate may be suitably separated, as by filtration or decantation, and purified by recrystallization—as by dissolving it in a minimum amount of ethyl or isopropyl or other suitable alcohol, adding ether until incipient cloudiness appears, and then chilling to cause crystallization.

Ephedrine n-butyl-sulphonate is a white crystalline solid, soluble in methyl, ethyl, and isopropyl alcohol, more soluble in water, relatively insoluble in ether, and somewhat soluble in oils; and, after drying in vacuo over sulphuric acid, melts at about 152.6° to 155° C. (Anschütz).

Example 2.—Instead of using n-butyl sulphonic acid as in Example 1, I may use any of the following sulphonic acids, in amounts substantially molecularly equivalent to the amount of n-butyl sulphonic acid given in Example 1.

n-Amyl sulphonic acid.
1-methyl-butyl sulphonic acid.
n-Hexyl sulphonic acid.
1-methyl-pentyl sulphonic acid.
1,3-dimethyl-butyl sulphonic acid.
2-ethyl-butyl sulphonic acid.
n-Heptyl sulphonic acid.
2,4-dimethyl-pentyl sulphonic acid.
1-methyl-heptyl sulphonic acid.
2-ethyl-hexyl sulphonic acid.
n-Nonyl sulphonic acid.
Lauryl sulphonic acid.
Myristyl sulphonic acid.
Cetyl sulphonic acid.
Stearyl sulphonic acid.
Oleyl sulphonic acid.

These sulphonic acids may all be made, by known process, with sodium sulphite and the respectively corresponding bromides or chlorides.

The ephedrine salts of these substituted sulphonic acids are all white crystalline solids, and are all soluble in methyl, ethyl, and isopropyl alcohol, more soluble in water, relatively insoluble in ether, and somewhat soluble in oils. Their approximate melting points are as follows, as taken by the Anschütz thermometer unless indicated as uncorrected:

Ephedrine n-amyl sulphonate___ 167–168° C.
Ephedrine 1-methyl-butyl sulphonate_____ 117–119.5° C.
Ephedrine n-hexyl sulphonate___ 157–158° C., uncorrected
Ephedrine 1-methyl-pentyl sulphonate_____ 133.7–139° C., probably somewhat impure
Ephedrine 1,3-dimethyl-butyl sulphonate_____ 133–135.2° C.
Ephedrine 2-ethyl-butyl sulphonate_____ 153–154.2° C.
Ephedrine n-heptyl sulphonate__ 141–141.7° C.
Ephedrine 2,4-dimethyl-pentyl sulphonate_____ 134.5–137° C.
Ephedrine 1-methyl-heptyl sulphonate_____ 110–112° C.
Ephedrine 2-ethyl-hexyl sulphonate_____ 102.5–104.5° C.
Ephedrine n-nonyl sulphonate___ 131–132° C., uncorrected
Ephedrine lauryl sulphonate____ 123–125° C., uncorrected
Ephedrine myristyl sulphonate__ 119–122° C., uncorrected The oil-solubility of these products tends in general to be greater as the molecular weight is increased.

Example 3.—Instead of using ephedrine as the organic base, as in Examples 1 and 2, I may use epinephrine. This will react, in the same general manner as does ephedrine, with the various substituted sulphonic acids, to produce epinephrine aliphatic sulphonates. As an example of this reaction, I suspend 1 gm. of epinephrine in 25 cc. of absolute ethyl alcohol, dissolve in 25 cc. of ether slightly more of the desired aliphatic sulphonic acid than is required to make a molecular equivalent of 1 gm. of epinephrine, and pour one (usually the solution) into the other (usually the suspension). Reaction occurs between the epinephrine and the aliphatic sulphonic acid, and the desired epinephrine aliphatic sulphonate goes into solution in the composite solvent. This sulphonate may be obtained in solid form, although with some difficulty. This may be done by subjecting the solution to evaporation in vacuo until a viscous syrup is obtained, then adding to this syrup several volumes of anhydrous ether, and then allowing the whole to stand at low temperature (about 0° to 10° C.) for several days; whereupon, with such care as is necessary for difficult crystallization, the solid sulphonate may be obtained.

Epinephrine n-hexyl sulphonate, which is representative of the epinephrine aliphatic sulphonates thus obtainable, is soluble in methyl, ethyl, and isopropyl alcohol, more soluble in water, and relatively insoluble in ether; and, after drying in vacuo over sulphuric acid, melts with decomposition at about 83° C.

Example 4.—In addition to ephedrine and epinephrine, other organic bases which have pressor effects may be used as the organic base. Among them are:

β-phenyl-ethyl amine.
Tyramine.
Benzyl-methyl-carbinamine.
Phenyl-1-amino-2-propanol-1.
Methyl-aminoaceto-catechol.
1-α-hydroxy-β-methylamino-3-hydroxyethylbenzene.
α-hydroxy-β-amino-3,4-dihydroxypropylbenzene.

These are caused to react with the desired aliphatic sulphonic acid in the general manner of Examples 1 and/or 2, with the sulphonic acid in solution in anhydrous ether, and with the organic base in solution in ether when it is soluble in ether but otherwise usually in suspension or solution in absolute ethyl alcohol. The reaction between the aliphatic sulphonic acid and the organic base, in many of these cases, produces precipitates which are readily separable from the supernatant liquid, as by filtration or decantation; although sometimes to obtain such separation it is necessary to remove the alcohol, as by evaporation in vacuo. In some cases, however, solid precipitates are not obtained; and in those cases it is necessary to drive off all the solvent in order to obtain the sulphonate in either solid or syrupy form.

As obtained in solid form, the aliphatic sulphonates thus obtained may be suitably purified by recrystallization—as by dissolving them in a minimum amount of isopropyl or other suitable alcohol, adding ether until incipient cloudiness appears, and then chilling to cause crystallization. They are in general white solids, soluble in methyl, ethyl, and isopropyl alcohol, more soluble in water, relatively insoluble in ether, and somewhat soluble in oils. Among the products which are thus obtainable are the following, which have the melting points indicated:

Degrees centigrade
β-phenyl-ethyl-amine-2,4-dimethyl-pentyl sulphonate_____ 93.5–95
Tyramine sec-amyl sulphonate_____ 134.5–136
Benzyl-methyl-carbinamine n-amyl sulphonate_ 88–89
Phenyl-1-amino-2-propanol-1 n-hexyl sulphonate_____ 129–129.5
Methyl-aminoaceto-catechol 2-ethyl-hexyl sulphonate_____ 169–171

The n-butyl sulphonate of 1-α-hydroxy-β-methylamino-3-hydroxyethylbenzene has been obtained as a syrup which has not been crystallized.

These various products are in general either white or whitish solids, or viscous syrups; and are soluble in water, and relatively insoluble in ether. Those which are obtained in solid form may be purified by recrystallization, in a manner already indicated for other aliphatic sulphonates.

These aliphatic sulphonates of β-phenyl-ethyl amine and its derivatives have the therapeutic action of presser substances, corresponding in general to the actions of the amines from which they are derived.

I claim as my invention:

1. A therapeutically active salt of an aliphatic sulphonic acid which has the formula:

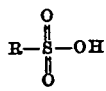

in which R represents an aliphatic substituent which has between four and eighteen carbon atoms and is of the class consisting of primary straight-chain and primary branched-chain and secondary groups and has one of its carbon atoms directly linked to the sulphur atom of the sulphonic-acid group, and of a pressor substance of the class consisting of β-phenyl-ethyl amine and its following derivatives:

Ephedrine,
Epinephrine,
Tyramine,
Benzyl-methyl-carbinamine,
Phenyl-1-amino-2-propanol-1,
Methyl-aminoaceto-catechol,
1-α-hydroxy - β - methylamino-3 - hydroxyethyl-benzene,
α-hydroxy-β-amino-3,4-dihydroxypropylbenzene.

2. A therapeutically active salt as set forth in claim 1, in which the organic base is ephedrine.

3. A therapeutically active salt as set forth in claim 1, in which the organic base is epinephrine.

HORACE A. SHONLE.

Certificate of Correction

Patent No. 2,215,940.                                          September 24, 1940.

HORACE A. SHONLE

It is hereby certified that errors appear in the printed specification of the above numbered patent requiring correction as follows: Page 1, first column, line 17, page 2, second column, line 34, page 3, first column, line 1, and second column, line 16, for "$1-\alpha$" read $l-\alpha$; and that the said Letters Patent should be read with these corrections therein that the same may conform to the record of the case in the Patent Office.

Signed and sealed this 12th day of November, A. D. 1940.

[SEAL]

HENRY VAN ARSDALE,
*Acting Commissioner of Patents.*